United States Patent
Park et al.

(10) Patent No.: US 8,685,567 B2
(45) Date of Patent: Apr. 1, 2014

(54) RECHARGEABLE LITHIUM BATTERY

(75) Inventors: Su-Yeong Park, Suwon-si (KR);
Nam-Soon Choi, Suwon-si (KR);
Kyoung-Han Yew, Suwon-si (KR);
Doo-Kyoung Lee, Suwon-si (KR);
Sung-Soo Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 782 days.

(21) Appl. No.: 12/208,672

(22) Filed: Sep. 11, 2008

(65) Prior Publication Data

US 2009/0068566 A1    Mar. 12, 2009

(30) Foreign Application Priority Data

Sep. 12, 2007   (KR) .................. 10-2007-0092763

(51) Int. Cl.
*H01M 4/13*     (2010.01)
(52) U.S. Cl.
USPC .......... 429/231.2; 429/231.5; 429/231.1; 429/231.3; 429/231.6; 429/323; 429/330; 429/331; 429/333; 429/199; 429/307
(58) Field of Classification Search
USPC .......... 429/231.2, 231.5, 231.1, 231.3, 231.6, 429/323, 330, 331, 333, 199, 307
See application file for complete search history.

(56) References Cited

U.S. PATENT DOCUMENTS

| | | | |
|---|---|---|---|
| 5,284,721 A | 2/1994 | Beard | |
| 5,378,560 A | 1/1995 | Tomiyama | |
| 5,478,671 A | 12/1995 | Idota | |
| 5,506,075 A | 4/1996 | Iwasaki et al. | |
| 5,700,598 A | 12/1997 | Denis et al. | |
| 5,705,291 A | 1/1998 | Amatucci et al. | |
| 5,795,679 A | 8/1998 | Kawakami et al. | |
| 6,071,489 A | 6/2000 | Sun et al. | |
| 6,210,834 B1 | 4/2001 | Kweon et al. | |
| 6,218,050 B1 | 4/2001 | Yoon et al. | |
| 6,221,531 B1 | 4/2001 | Vaughey et al. | |
| 6,316,143 B1 | 11/2001 | Foster et al. | |
| 6,322,928 B1 | 11/2001 | Thackeray et al. | |

(Continued)

FOREIGN PATENT DOCUMENTS

| | | | |
|---|---|---|---|
| CN | 1298556 A | 6/2001 | |
| CN | 1304187 A | 7/2001 | |

(Continued)

OTHER PUBLICATIONS

SIPO Office action dated Dec. 29, 2010, for corresponding Chinese Patent application 200810149608.5, with English translation, noting references previously filed in an IDS dated May 25, 2010.

(Continued)

*Primary Examiner* — Laura Weiner
(74) *Attorney, Agent, or Firm* — Christie, Parker & Hale, LLP

(57) ABSTRACT

A rechargeable lithium battery including: a negative electrode including lithium-vanadium-based oxide, negative active material; a positive electrode including a positive active material to intercalate and deintercalate lithium ions; and an electrolyte including a non-aqueous organic solvent, and a lithium salt. The lithium salt includes 0.7 to 1.2M of a first lithium salt including LiPF6; and 0.3 to 0.8M of a second lithium salt selected from the group consisting of $LiBC_2O_4F_2$, $LiB(C_2O_4)_2$, $LiN(SO_2C2F_5)_2$, $LiN(SO_2CF_3)_2$, $LiBF_4$, $LiClO_4$, and combinations thereof.

14 Claims, 2 Drawing Sheets

(56) References Cited

U.S. PATENT DOCUMENTS

| | | | |
|---|---|---|---|
| 6,413,669 B1 | 7/2002 | Takeuchi et al. | |
| 6,482,537 B1 | 11/2002 | Strangman et al. | |
| 6,517,974 B1 | 2/2003 | Kobayashi et al. | |
| 6,589,696 B2 | 7/2003 | Matsubara et al. | |
| 6,596,437 B2 | 7/2003 | Yoon et al. | |
| 6,617,073 B1 | 9/2003 | Matsumoto et al. | |
| 6,767,669 B2 | 7/2004 | Matsubara et al. | |
| 6,783,890 B2 | 8/2004 | Kweon et al. | |
| 6,911,282 B2 | 6/2005 | Kasamatsu et al. | |
| 6,986,968 B2 | 1/2006 | Hong et al. | |
| 7,083,878 B2 * | 8/2006 | Kotato et al. | 429/338 |
| 7,285,358 B2 | 10/2007 | Park et al. | |
| 7,682,746 B2 | 3/2010 | Koshina | |
| 2001/0019774 A1 | 9/2001 | Suzuki et al. | |
| 2001/0028874 A1 | 10/2001 | Cho et al. | |
| 2001/0046628 A1 | 11/2001 | Oesten et al. | |
| 2001/0055711 A1 | 12/2001 | Ito et al. | |
| 2003/0003362 A1 | 1/2003 | Leising et al. | |
| 2003/0031919 A1 | 2/2003 | Isozaki et al. | |
| 2003/0049541 A1 | 3/2003 | Inagaki et al. | |
| 2003/0124431 A1 | 7/2003 | Hwang et al. | |
| 2003/0130114 A1 | 7/2003 | Hampden-Smith et al. | |
| 2003/0207178 A1 | 11/2003 | Hu et al. | |
| 2003/0211396 A1 | 11/2003 | Kobayashi et al. | |
| 2003/0215700 A1 | 11/2003 | Hosoda et al. | |
| 2004/0005265 A1 | 1/2004 | Chiang et al. | |
| 2004/0018431 A1 | 1/2004 | Gozdz et al. | |
| 2004/0029010 A1 | 2/2004 | Sada et al. | |
| 2004/0072073 A1 | 4/2004 | Okochi et al. | |
| 2004/0106040 A1 | 6/2004 | Fukuoka et al. | |
| 2004/0157133 A1 | 8/2004 | Kim et al. | |
| 2005/0042515 A1 | 2/2005 | Hwang et al. | |
| 2005/0079417 A1 | 4/2005 | Kim et al. | |
| 2005/0164090 A1 * | 7/2005 | Kim et al. | 429/231.2 |
| 2005/0175897 A1 | 8/2005 | Jung et al. | |
| 2005/0191550 A1 | 9/2005 | Satoh et al. | |
| 2006/0088766 A1 | 4/2006 | Kim et al. | |
| 2006/0166098 A1 | 7/2006 | Tabuchi et al. | |
| 2006/0204850 A1 | 9/2006 | Ham et al. | |
| 2006/0222950 A1 | 10/2006 | Koshina | |
| 2006/0236528 A1 | 10/2006 | Xu et al. | |
| 2007/0099085 A1 | 5/2007 | Choi et al. | |
| 2007/0166615 A1 | 7/2007 | Takamuku et al. | |
| 2007/0207384 A1 | 9/2007 | Nakura | |
| 2008/0118834 A1 | 5/2008 | Yew et al. | |
| 2008/0118840 A1 | 5/2008 | Yew et al. | |
| 2008/0118841 A1 | 5/2008 | Kim et al. | |
| 2008/0145758 A1 | 6/2008 | Kim et al. | |
| 2008/0182171 A1 | 7/2008 | Maeda et al. | |
| 2008/0182172 A1 | 7/2008 | Takamuku et al. | |
| 2008/0241688 A1 | 10/2008 | Tokita et al. | |
| 2008/0254365 A1 | 10/2008 | Kim et al. | |
| 2008/0305397 A1 | 12/2008 | Kobayashi et al. | |
| 2009/0023070 A1 | 1/2009 | Tokita et al. | |
| 2009/0068562 A1 * | 3/2009 | Yew et al. | 429/231.5 |
| 2010/0143800 A1 | 6/2010 | Sawada et al. | |

FOREIGN PATENT DOCUMENTS

| | | | |
|---|---|---|---|
| CN | 1339834 A | 3/2002 | |
| CN | 1416600 A | 5/2003 | |
| CN | 1417876 A | 5/2003 | |
| CN | 1607687 | 4/2005 | |
| CN | 1624960 A | 6/2005 | |
| CN | 1783551 A | 6/2006 | |
| CN | 1841816 A | 10/2006 | |
| CN | 1992420 | 7/2007 | |
| EP | 1 511 101 A2 | 3/2005 | |
| EP | 1 708 296 A1 | 10/2006 | |
| EP | 1 801 908 A1 | 6/2007 | |
| JP | 59-020971 | 2/1984 | |
| JP | 06-060867 | 3/1994 | |
| JP | 06-275265 | 9/1994 | |
| JP | 06-302320 | 10/1994 | |
| JP | 06-325791 | 11/1994 | |
| JP | 07-014580 | 1/1995 | |
| JP | 07-029600 | 1/1995 | |
| JP | 07-029608 | 1/1995 | |
| JP | 07-122298 | 5/1995 | |
| JP | 08-124568 | 5/1996 | |
| JP | 08-241707 | 9/1996 | |
| JP | 10-188977 | 7/1998 | |
| JP | 10-247497 | 9/1998 | |
| JP | 10-270018 | 10/1998 | |
| JP | 10-340723 | 12/1998 | |
| JP | 11-185753 | 7/1999 | |
| JP | 11-283627 | 10/1999 | |
| JP | 11-329435 | 11/1999 | |
| JP | 11-354104 | 12/1999 | |
| JP | 2000-058059 | 2/2000 | |
| JP | 2000-090916 | 3/2000 | |
| JP | 2000-299132 | 10/2000 | |
| JP | 2001-006683 | 1/2001 | |
| JP | 2001-015101 | 1/2001 | |
| JP | 2001-216962 | 8/2001 | |
| JP | 2001-297796 | 10/2001 | |
| JP | 2001-325950 | 11/2001 | |
| JP | 2002-008652 | 1/2002 | |
| JP | 2002-216753 | 8/2002 | |
| JP | 2002-324551 | 11/2002 | |
| JP | 2002-326818 | 11/2002 | |
| JP | 2002-343431 | 11/2002 | |
| JP | 2002-352801 | 12/2002 | |
| JP | 2002-362923 | 12/2002 | |
| JP | 2003-017053 | 1/2003 | |
| JP | 2003-68305 | 3/2003 | |
| JP | 2003-123757 | 4/2003 | |
| JP | 2003-142096 | 5/2003 | |
| JP | 2003-208891 | 7/2003 | |
| JP | 2004-139947 | 5/2004 | |
| JP | 2004-149391 | 5/2004 | |
| JP | 2004-327190 | 11/2004 | |
| JP | 2005-072008 | 3/2005 | |
| JP | 2005-135872 | 5/2005 | |
| JP | 2005-158604 | 6/2005 | |
| JP | 2005-216855 | 8/2005 | |
| JP | 2006-066085 | 3/2006 | |
| JP | 2006-128115 | 5/2006 | |
| JP | 2006-286599 | 10/2006 | |
| JP | 2007-173096 | 7/2007 | |
| KR | 2000-0060301 | 10/2000 | |
| KR | 2001-0090522 | 10/2001 | |
| KR | 10-0331370 | 8/2002 | |
| KR | 2003-0021112 | 3/2003 | |
| KR | 10-2003-0032220 | 4/2003 | |
| KR | 2004-0082803 | 9/2004 | |
| KR | 10-2005-20185 | * 3/2005 | |
| KR | 10-2005-0052268 | 6/2005 | |
| KR | 10-497251 | 6/2005 | |
| KR | 10-2005-0077079 | 8/2005 | |
| KR | 2006-0028327 | 3/2006 | |
| KR | 10-0570648 | 4/2006 | |
| KR | 10-0570649 | 4/2006 | |
| KR | 2006-41828 | 5/2006 | |
| KR | 2006-50745 | 5/2006 | |
| KR | 2006-0095221 | 8/2006 | |
| KR | 2007-0016431 | 2/2007 | |
| KR | 10-2007-0091028 | * 9/2007 | |
| KR | 10-2007-0091938 | * 9/2007 | |
| KR | 10-759410 | 9/2007 | |
| KR | 10-0759410 B1 | 9/2007 | |
| WO | WO 95/02001 A1 | 1/1995 | |
| WO | WO 97/28569 | 8/1997 | |
| WO | WO 02/061864 A1 | 8/2002 | |
| WO | WO 03/038931 A1 | 5/2003 | |
| WO | WO 03/096449 A1 | 11/2003 | |
| WO | WO 2006/115681 | 11/2006 | |

OTHER PUBLICATIONS

*Journal of Power Source*, 81-82, 651-655, 1999.
*Solid State Ionics*, 139, 57-65, 2001.
U.S. Office action dated Mar. 6, 2013, for cross reference U.S. Appl. No. 11/937,462, (9 pages).

(56) References Cited

OTHER PUBLICATIONS

SIPO Reexamination dated Apr. 3, 2013, with English translation, for Chinese Patent application 200710300121.8, (27 pages).
English translation of SIPO Office action dated Aug. 28, 2009, for Chinese Patent application 200710152425.4, previously submitted in an IDS dated Oct. 18, 2011 (10 pages).
U.S. Office action dated Mar. 24, 2008, for cross reference U.S. Appl. No. 11/834,335, 14 pages.
U.S. Office action dated May 13, 2009, for cross reference U.S. Appl. No. 11/947,708, 25 pages.
U.S. Office action dated Jul. 2, 2009, for cross reference U.S. Appl. No. 11/937,462, 15 pages.
U.S. Office action dated Nov. 16, 2009, for cross-reference U.S. Appl. No. 12/135,078, 32 pages.
SIPO Office action dated Aug. 28, 2009, for Chinese application 200710152425.4. 8 pages.
SIPO Office action dated Sep. 21, 2010 for Chinese Patent application 200710169308.9, with English translation, 11 pages.
SIPO Office action dated Aug. 14, 2009 for Chinese Patent application 200710169308.9, 6 pages.
SIPO Office action dated Oct. 18, 2010 for Chinese Patent application 200710169731.9, with English translation, 12 pages.
SIPO Office action dated Oct. 13, 2010 for Chinese Patent application 200710169303.6, with English translation, 13 pages.
SIPO Office Action dated May 25, 2010 for Chinese Patent application 200710169731.9, 5 pages.
SIPO Office Action dated Aug. 21, 2009 for. Chinese Patent application 200710169731.9, with English translation, 6 pages.
KIPO Office action dated Aug. 29, 2009 for Korean Patent application 10-2007-0091028, 4 pages.
KIPO Office action dated May 31, 2010 for Korean Patent application 10-2008-0063918, 5 pages.
European Search Report dated Jun. 12, 2008 for European Patent application 07121189.0, 9 pages.
European Search Report dated Nov. 13, 2006, for European application 04090319.7, 4 pages.
European Search Report dated Feb. 18, 2008, for European application 07120913.4, 6 pages.
European Search Report dated Feb. 27, 2008 for European Patent application 07121149.4, 13 pages.
European Search Report dated Jun. 2, 2008, for European application 08100042.4, 10 pages.
European Search Report dated Jun. 2, 2008, for European application 07116182.2, 8 pages.
Yamamoto, et al., *Anode Properties of Li1+xV1−xO2 for Lithium Secondary Batteries*, JASRI/Spring 8, pp. 332-333.
Van Landschoot, N., *Citric acid-assisted synthesis and characterization of doped LiCoVO4*, Solid State Ionics, vol. 166, (2004), Science Direct, pp. 307-316, XP-002475389.
Sivashanmugam, A., *Glycine-Assisted Sol-Gel Combustion Synthesis and Characterization of Aluminum-Doped LiNiVO4 for Use in Lithium-Ion Batteries*, Journal of Electrochemical Society, vol. 153, No. 3, (2006), pp. A497-A503, XP-002475390.
Huang, F., et al., *A novel Li2Ag0.5V2O5 composite film cathode for all-solid-state lithium batteries*, Electrochemistry Communications, vol. 5, (2003), pp. 262-266.
Ohzuku et al., *Zero-Strain Insertion Material of Li[Li1/3Ti5/3]O4 for Rechargeable Lithium Cells*, Journal of the Electrochemical Society, vol. 142, No. 5, May 1995, pp. 1431-1435, XP-002401881.
Mi, et al., *Carbon-coated Li1.2Cr0.4Ti0.4O2 Cathode Material for Lithium-Ion Batteries*, Electrochemical and Solid-State Letters, vol. 9, No. 7, (2006), pp. A324-A327, XP-002467438.
Japanese Office action dated Sep. 7, 2010 for Japanese Patent application 2007-153122.
Japanese Office action dated Aug. 31, 2010 for Japanese Patent application 2007-175311, 3 pages.
Japanese Office action dated Mar. 29, 2011 for Japanese Patent application 2007-303286, 4 pages.
Patent Abstracts of Japan and English machine translation for Japanese Publication 06-325791, listed above, 36 pages, 1994.
Patent Abstracts of Japan, and English machine translation of Japanese Publication 07-014580, listed above, 21 pages, 1995.
Patent Abstracts of Japan and English machine translation for Japanese Publication 2001-006683, listed above, 13 pages.
Patent Abstracts of Japan and English machine translation for Japanese Publication 2002-326818, listed above, 48 pages.
Patent Abstracts of Japan and English machine translation for Japanese Publication 2002-352801, listed above, 13 pages.
Patent Abstracts of Japan and English machine translation for Japanese Publication 2002-362923 listed above, 17 pages.
Patent Abstracts of Japan and English machine translation for Japanese Publication 2004-149391 listed above, 100 pages.
Occlude.Dictionary.com, Random House, Inc., Accessed Jul. 15, 2010, 2 pages.
Absorbtion.Dictionary.com, Random House, Inc., Accessed Jul. 15, 2010, 2 pages.
Oskam, et al, *Sol-Gel Synthesis of Carbon/Silica Gel Electrodes for Lithium Intercalation*, Electrochemical and Solid-State Letters, vol. 2, No. 12, Dec. 12, 1999, pp. 610-612, XP 001101158.
Ng, et al, *Si—O network encapsulated graphite-silicon mixtures as negative electrodes for lithium-ion batteries*, Journal of Power Sources, vol. 94, No. 1, Feb. 15, 2001, pp. 63-67, XP 001164263.
Aurbach, et al, *Behavior of lithiated graphite electrodes comprising silica based binder*, Journal of Applied Electrochemistry, vol. 28, No. 10, Oct. 10, 1998, pp. 1051-1059, XP 000786929.
Chen, et al, *Improving the Performance of Soft Carbon for Lithium-Ion Batteries*, Electrochimica acta, vol. 51, No. 19, May 20, 2006, pp. 3890-3894, XP 5427738A.
SIPO Reexam Office action dated Sep. 26, 2012, for corresponding Chinese Patent application 200810149608.5, with English translation, (13 pages).
U.S. Notice of Allowance dated May 26, 2011, for cross reference U.S. Appl. No. 11/641,947 (now U.S. Patent 8,026,004), (11 pages).
U.S. Office action dated Mar. 28, 2012, for cross reference U.S. Appl. No. 12/135,078, (29 pages).
U.S. Office action dated May 26, 2010, for cross reference U.S. Appl. No. 12/135,078, (35 pages).
U.S. Office action dated Jun. 3, 2010, for cross reference U.S. Appl. No. 11/258,150 (now abandoned), (15 pages).
U.S. Office action dated Sep. 8, 2010, for cross reference U.S. Appl. No. 11/590,980 (now U.S. Patent 8,119,283), (8 pages).
U.S. Office action dated Jun. 24, 2011, for cross reference U.S. Appl. No. 11/590,980 (now U.S. Patent 8,119,283), (11 pages).
U.S. Office action dated Jan. 6, 2010, for cross reference U.S. Appl. No. 11/641,947, (17 pages).
U.S. Office action dated Jul. 23, 2009, for cross reference U.S. Appl. No. 11/641,947, (20 pages).
U.S. Notice of Allowance dated Oct. 17, 2011, for cross reference U.S. Appl. No. 11/590,980 (now U.S. Patent 8,119,283), (8 pages).
U.S. Notice of Allowance dated Jan. 6, 2011, for cross reference U.S. Appl. No. 11/590,980 (now U.S. Patent 8,119,283), (6 pages).
Liu, et al., *A soft chemistry synthesis and electrochemical properties of LiV3O8 as cathode material for lithium secondary batteries*, Solid State Ionics, (2005), vol. 176, pp. 1549-1554, XP-002475780.
Japanese Office action dated Mar. 8, 2011, for Japanese Patent application 2007-303257, (3 pages).
Japanese Office action dated Jul. 3, 2012, for corresponding Japanese Patent application 2007-151715, (4 pages).
Patent Abstracts of Japan, and English machine translation of Japanese Publication 10-340723 listed above (22 pages), 1998.
Patent Abstracts of Japan, and English machine translation of Japanese Publication 11-354104 listed above (18 pages), 1999.
Patent Abstracts of Japan, and English machine translation of Japanese Publication 2001-015101 listed above (11 pages).
Patent Abstracts of Japan, and English machine translation of Japanese Publication 2001-216962 listed above (11 pages).
English Abstract and English machine translation of Japanese Publication 2002-324551 listed above (8 pages).
English Abstract and English machine translation of Japanese Publication 2003-208891 listed above (10 pages).
English Abstract and English machine translation of Japanese Publication 2003-068305, previously submitted in an Information Disclosure Statement dated Oct. 18, 2011 (17 pages).

(56) References Cited

OTHER PUBLICATIONS

SIPO Decision of Reexmination dated Nov. 29, 2012, for corresponding Chinese Patent application 200810149608.5, with English translation of p. 1 only, (19 pages).

U.S. Office action dated Oct. 26, 2012, for cross reference U.S. Appl. No. 11/937,462, (20 pages).

U.S. Office action dated Oct. 24, 2012, for cross-reference U.S. Appl. No. 12/135,078, (11 pages).

* cited by examiner

RECHARGEABLE LITHIUM BATTERY

CROSS-REFERENCE TO RELATED APPLICATION

This application claims the benefit of Korean Application No. 2007-92763, filed Sep. 12, 2007, in the Korean Intellectual Property Office, the disclosure of which is incorporated herein by reference.

BACKGROUND OF THE INVENTION

1. Field of the Invention

Aspects of the present invention relate to a rechargeable lithium battery.

2. Description of the Related Art

Lithium rechargeable batteries have recently drawn attention as a power sources for small portable electronic devices. Lithium batteries use an organic electrolyte solution, and thereby have twice the discharge voltage of a conventional battery using an alkali aqueous solution, and accordingly, have higher energy densities.

For a positive active material of a rechargeable lithium battery, lithium-transition element composite oxides capable of intercalating lithium, such as, $LiCoO_2$, $LiMn_2O_4$, $LiNiO_2$, $LiNi_{1-x}Co_xO_2$ ($0<x<1$), and the like, have been researched.

For a negative active material of a rechargeable lithium battery, various carbon-based materials, such as, artificial graphite, natural graphite, and hard carbon have been used, which can all intercalate and deintercalate lithium ions. The graphite of the carbon-based material increases a discharge voltage and an energy density of a battery, due to a low discharge potential of –0.2V, as compared to lithium. A battery using graphite as a negative active material has a high average discharge potential of 3.6V and an excellent energy density. Furthermore, graphite is the most comprehensively used among the aforementioned carbon-based materials, since graphite guarantees a better cycle life for a battery, due to its outstanding reversibility. However, a graphite active material has a low density, and consequently, a low capacity in terms of energy density per unit volume when used as a negative active material. Further, there are some dangers, such as, explosion and/or combustion, when a battery is misused, overcharged, or the like, because graphite is likely to react with an organic electrolyte at high discharge voltages.

In order to solve these problems, a great deal of research on oxide negative materials for electrodes has recently been performed. For example, an amorphous tin oxide, developed by Japan Fuji Film Co., Ltd., has a high capacity per weight (800 mAh/g). However, the tin oxide has some critical defects, such as, a high initial irreversible capacity of up to 50%. The discharge potential of the tin oxide is more than 0.5V, and the tin oxide shows a smooth voltage profile, which is unique to the amorphous phase. Consequently, it was hard to develop a tin oxide applicable to a battery. Furthermore, a portion of the tin oxide was reduced to tin, during the charge and/or discharge reactions, which is a disadvantage for use in a battery.

Referring to another oxide negative electrode, a negative active material of $Li_aMg_bVO_c$ ($0.05\leq a\leq 3$, $0.12\leq b\leq 2$, $2\leq 2c-a-2b\leq 5$) is disclosed in Japanese Patent Publication 2002-216753. The characteristics of a rechargeable lithium battery including Li1.1V0.9O2 were also presented in the 2002 Japanese Battery Conference (Preview No. 3B05).

A negative active material of a metal vanadium oxide not including Li (i.e., x=0), as disclosed in *Solid State Ionics*, 139, 57-65, 2001 and the *Journal of Power Source*, 81-82, 651-655, 1999, has a different crystalline structure from a negative active material as taught herein. In addition, since negative active material of the references has an average discharge potential of more than 1.0V, it may have problems when used as a negative electrode.

The above oxide negative electrodes do not show sufficient battery performance, and therefore, there has been a great deal of further research into oxide negative materials.

SUMMARY OF THE INVENTION

An exemplary embodiment of the present invention provides a rechargeable lithium battery having excellent capacity and cycle-life characteristics.

According to an exemplary embodiment of the present invention, provided is a rechargeable lithium battery that includes: a negative electrode including a lithium-vanadium-based oxide, for a negative active material; a positive electrode including a positive active material capable of intercalating and deintercalating lithium ions; and an electrolyte including a non-aqueous organic solvent, and a lithium salt. The lithium salt includes 0.7 to 1.2M of a first lithium salt, which can include, for example, $LiPF_6$; and 0.3 to 0.8M of a second lithium salt selected from the group consisting of $LiBC_2O_4F_2$, $LiB(C_2O_4)_2$, $LiN(SO_2C_2F_5)_2$, $LiN(SO_2CF_3)_2$, $LiBF_4$, $LiClO_4$, and combinations thereof.

The lithium-vanadium-based oxide is represented by the following Formula 1:

$$Li_xM_yV_zO_{2+d}$$ [Chemical Formula 1]

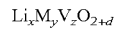

In the above Formula, $0.1\leq x\leq 2.5$, $0\leq y\leq 0.5$, $0.5\leq z\leq 1.5$, $0\leq d\leq 0.5$, and M is a metal selected from the group consisting of Al, Cr, Mo, Ti, W, Zr, and combinations thereof.

The first lithium salt can be included at a concentration of 0.8 to 1.2M. The second lithium salt can be included at a concentration of 0.3 to 0.7M. The first lithium salt can be $LiPF_6$, and the second lithium salt can be $LiBC_2O_4F_2$.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
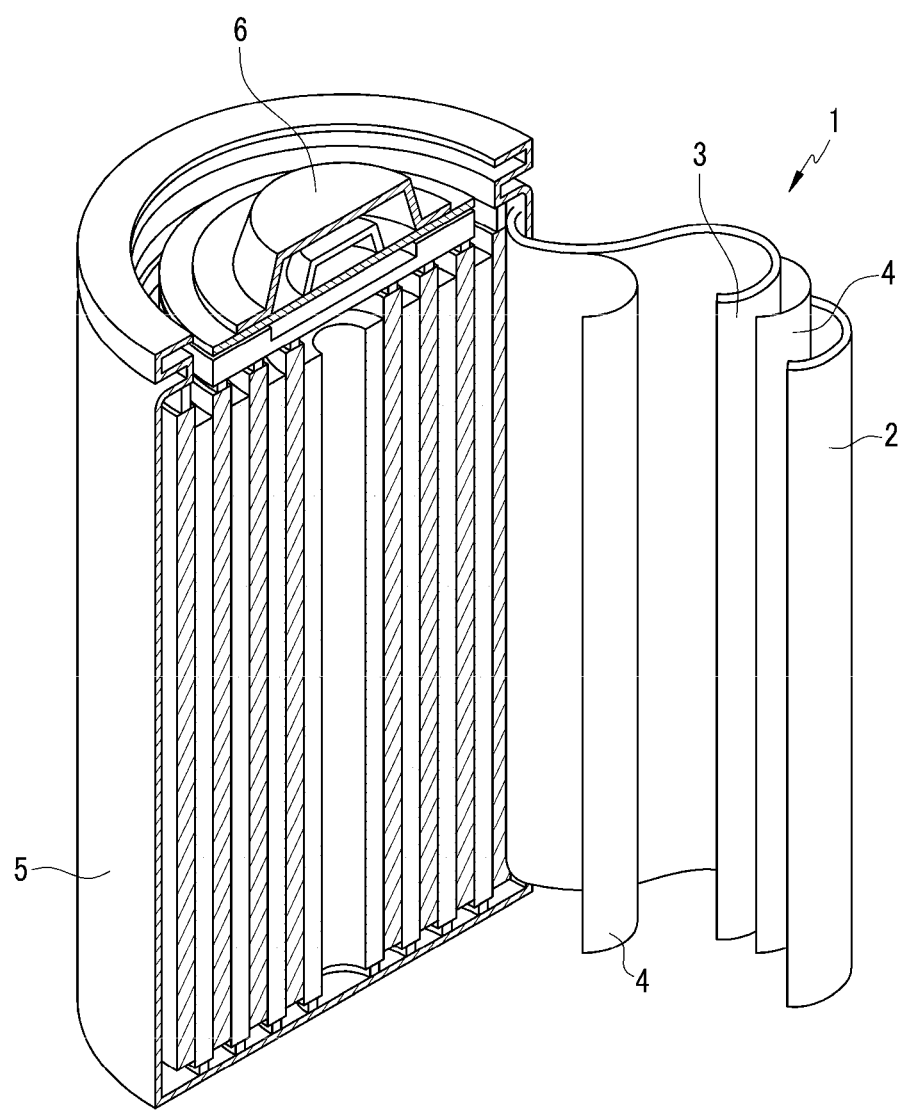
FIG. 1 is a schematic view of a rechargeable lithium battery according to an exemplary embodiment of the present invention.

Reference will now be made in detail to the present embodiments of the present invention, examples of which are illustrated in the accompanying drawings, wherein like reference numerals refer to the like elements throughout. The embodiments are described below, in order to explain the present invention by referring to the figures.

The rechargeable lithium battery, according to an exemplary embodiment of the present invention, includes: a negative electrode including a lithium-vanadium-based oxide as a negative active material; a positive electrode including a positive active material capable of intercalating and deintercalating lithium ions; and an electrolyte including a non-aqueous organic solvent, and a lithium salt.

The lithium salt supplies lithium ions in the battery, provides for a basic operation of a rechargeable lithium battery, and improves lithium ion transport between the positive and negative electrodes.

A rechargeable lithium battery, including a conventional lithium-vanadium-based oxide for a negative active material, shows a sharply decreased capacity at an initial charge and discharge cycle, and shows an "L" shaped capacity curve. Therefore, such a battery shows diminished cycle-life characteristics.

In order to solve the problem, $LiPF_6$ has been generally used in a high concentration of 1M or more. However, $LiPF_6$ generates a decomposition product, such as HF, that may damage a passivation film. As a result, the performance of an active material may be diminished and cycle-life characteristics may also be diminished.

The passivation film is also referred to as a solid electrolyte interface (SEI) film. The passivation film, in a rechargeable lithium battery including lithium-transition element oxide as a positive active material and carbon as a negative active material, may be formed as follows: lithium ions are deintercalated from the positive active material at an initial charging and then intercalated into carbon of a negative electrode. The lithium ions may react with and/or on the carbon to produce $Li_2CO_3$, LiO, LiOH, and the like, due to a high reactivity. Such products form a passivation film on a surface of a negative electrode.

According to an exemplary embodiment of the present invention, an electrolyte including a lithium salt of a specific composition is provided. The lithium salt includes 0.7 to 1.2M of a first lithium salt, which includes $LiPF_6$; and 0.3 to 0.8M of a second lithium salt selected from the group consisting of $LiBC_2O_4F_2$, $LiB(C_2O_4)_2$, $LiN(SO_2C_2F_5)_2$, $LiN(SO_2CF_3)_2$, $LiBF_4$, $LiClO_4$, and combinations thereof.

According to an exemplary embodiment, the first lithium salt is included at a concentration of 0.8 to 1.2M, and the second lithium salt is included at a concentration of 0.3 to 0.7M. When the first lithium salt is included at a concentration of less than about 0.7M, the ionic conductivity of an electrolyte can be reduced. When the first lithium salt is included at a concentration of more than about 1.2M, a passivation film may be formed with an excessive thickness, and a cell resistance can increase due to a decrease of ion conductivity. An initial efficiency and cycle-life characteristics may be thereby degraded. When the second lithium salt is included at a concentration of less than about 0.3M, the ionic conductivity of an electrolyte can be reduced. When the second lithium salt is included at a concentration of more than about 0.8M, an electrolyte viscosity increases and lithium ion mobility decreases.

The second lithium salt selected from the group consisting of $LiBC_2O_4F_2$, $LiB(C_2O_4)_2$, $LiN(SO_2C_2F_5)_2$, $LiN(SO_2CF_3)_2$, $LiBF_4$, $LiClO_4$, and combinations thereof. According to an exemplary embodiment of the present invention, the first lithium salt is $LiPF_6$, and the second lithium salt is $LiBC_2O_4F_2$.

In addition, the first lithium salt and the second lithium salt are included in a mole ratio of from 1:0.2 to 1:1.2. When the mole ratio of the first and second lithium salts are is within the above range, the ion conductivity may be improved and the resistance decreases, resulting in the improvement of the initial efficiency and cycle life characteristics.

In one embodiment of the present invention, the lithium salt includes a first lithium salt of $LiPF_6$ and a second lithium salt of $LiBC_2O_4F_2$ in a mole ratio of from 1:0.25 to 1:1.14. When the $LiPF_6$ and $LiBC_2O_4F_2$ are used at the above mole ratios, the initial efficiency and cycle life characteristics may be further improved, and the lithium ion mobility may be improved, due to a decrease of the electrolyte viscosity.

The lithium salts having the above structures can inhibit an abrupt decrease of charge and discharge capacity at an initial charge/discharge cycle.

As described above, when $LiPF_6$ is singularly used at a concentration of 1M, or more, the $LiPF_6$ may damage a passivation film.

The lithium salts can include a first lithium salt including $LiPF_6$; and a second lithium salt selected from the group consisting of $LiBC_2O_4F_2$, $LiB(C_2O_4)_2$, $LiN(SO_2C_2F_5)_2$, $LiN(SO_2CF_3)_2$, $LiBF_4$, $LiClO_4$, and combinations thereof. The combination of the first and second lithium salts can sufficiently supply lithium salts and inhibit damage to the passivation film, resulting in an improvement of the initial charge and discharge capacity, and the cycle life.

A high concentration of $LiPF_6$ may result in a reduction in cell performance, due to the generation of decomposed products, such as HF, by a continuous reaction such as the following Reaction Schemes 1 and 2 with film components. According to an exemplary embodiment, even though the second lithium salt including F ($LiBC_2O_4F_2$, $LiN(SO_2C_2F_5)_2$, $LiN(SO_2CF_3)_2$, or $LiBF_4$) is used, negligible amounts of HF is are generated and thus a passivation film is not damaged. The second lithium salt also provides lithium ions and inhibits a cycle-life reduction. The combination of $LiPF_6$ and the second lithium salt can inhibit lithium salt decomposition (generation of HF). The combination can provide a more stable passivation film, due to a reduction in damage to the film, as compared to a lithium salt used alone.

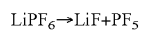
$LiPF_6 \rightarrow LiF + PF_5$ [Reaction Scheme 1]

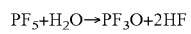
$PF_5 + H_2O \rightarrow PF_3O + 2HF$ [Reaction Scheme 2]

The lithium salts that include 0.7 to 1.2M of the first lithium salt including $LiPF_6$; and 0.3 to 0.8M of the second lithium salt selected from the group consisting of $LiBC_2O_4F_2$, $LiB(C_2O_4)_2$, $LiN(SO_2C_2F_5)_2$, $LiN(SO_2CF_3)_2$, $LiBF_4$, $LiClO_4$, and combinations thereof, can inhibit a reduction of an initial charge/discharge capacity of a lithium-vanadium-based oxide battery.

In one embodiment, the electrolyte includes an additive including an ethylene carbonate-based compound and an ether-based compound. The additive includes from 1 to 7 parts by weight of the ethylene carbonate-based compound and from 0.01 to 5 parts by weight of the ether-based compound, with respect to 100 parts by weight of the non-aqueous organic solvent. According to an exemplary embodiment, an additive including from 3 to 7 parts by weight of the ethylene carbonate-based compound and from 0.05 to 3 parts by weight of the ether-based compound, may be appropriate.

When ethylene carbonate-based compound is used in an amount of less than 1 part by weight, an insufficient passivation film on a surface of a negative electrode surface may be formed, and thereby cycle-life characteristics may be degraded. When the ethylene carbonate-based compound is used in an amount of more than 7 parts by weight, cell performance may be reduced.

When the ether-based compound is used in an amount of less than about 0.01 parts by weight, a use effect may not be sufficient. When the ether-based compound is used in an amount of more than about 5 parts by weight, a passivation film may formed with an excessive thickness, and a cell resistance increases, due to decrease of ion conductivity. Thereby, an initial efficiency and cycle-life characteristics may be reduced.

The ethylene carbonate-based compound can improve the safety and cycle-life characteristics of a rechargeable lithium battery and can be a compound represented by the following Formula 2:

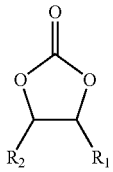

[Chemical Formula 2]

In Formula 2, $R_1$ and $R_2$ are independently selected from the group consisting of hydrogen, a halogen, a cyano (CN), a nitro ($NO_2$), and a C1 to C5 fluoroalkyl, provided that at least one of $R_1$ and $R_2$ is selected from the group consisting of a halogen, a cyano (CN), a nitro ($NO_2$), and a C1 to C5 fluoroalkyl.

Specific examples of the ethylene carbonate-based compound include at least one selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof.

Specific examples of the ether-based compound include at least one selected from the group consisting of dimethoxyethane (DME), bis(2-methoxyethyl)ether (DGM), triethylene glycol dimethylether (TEGDME), tetraethylene glycol dimethylether (TetGM), polyethylene glycol dimethylether (PEGDME), propylene glycol dimethylether (PGDME), dioxolane, and combinations thereof.

The additive can solve cycle-life deterioration of a rechargeable lithium battery, and minimize decomposition reactions of non-aqueous organic solvents, by forming a polymer film surrounding a negative active material. The non-aqueous organic solvent acts as a medium for transmitting ions taking part in the electrochemical reaction of the battery.

The non-aqueous organic solvent may include at least one solvent that is carbonate-based, ester-based, ketone-based, alcohol-based, or aprotic. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Examples of the ester-based solvent may include methyl acetate, ethyl acetate, n-propyl acetate, methylpropinonate, ethylpropinonate, γ-butyrolactone, decanolide, valerolactone, mevalonolactone, caprolactone, and the like.

Examples of the ketone-based solvent include cyclohexanone and the like. Examples of the alcohol-based solvent include ethanol, isopropyl alcohol, and the like. Examples the aprotic solvent include: nitriles, such as, X—CN (wherein, X is a C2 to C20 linear, branched, or cyclic hydrocarbon group including a double bond, an aromatic ring, or an ether bond); and amides, such as, dimethylformamide, dioxolanes such as 1,3-dioxolane, sulfolanes, and the like.

The non-aqueous organic solvent may be used singularly or in a mixture. When the non-aqueous organic solvent is used in a mixture, a mixture ratio can be controlled in accordance with a desired battery performance.

The carbonate-based solvent may include a mixture of a cyclic carbonate and a linear carbonate. Examples of the cyclic carbonate include at least one selected from the group consisting of ethylene carbonate, butylenes carbonate, propylene carbonate, γ-butyrolactone, and combinations thereof. The cyclic carbonates can be solvated with lithium ions, to increase the ion conductivity of an electrolyte.

Examples of the linear carbonate include at least one selected from the group consisting of dimethyl carbonate, methylethyl carbonate, diethyl carbonate, and combinations thereof. These linear carbonates have low viscosity, and thereby increase the ion conductivity of an electrolyte. However, these linear carbonates have low flash points, and therefore, when they are added in an excessive amount, they may decrease a flash point of an electrolyte. The cyclic carbonate and the chain carbonate are mixed together in the volume ratio of 1:1 to 1:9, and when the mixture is used as an electrolyte, the electrolyte performance may be enhanced.

The electrolyte, according to aspects of the present invention, may further include mixtures of carbonate-based solvents and aromatic hydrocarbon-based solvents. The carbonate-based solvents and the aromatic hydrocarbon-based solvents are preferably mixed together in the volume ratio of 1:1 to 30:1.

The aromatic hydrocarbon-based organic solvent may be a compound represented by the following Formula 3:

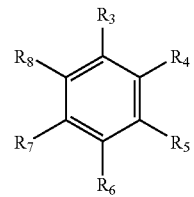

[Chemical Formula 3]

In Formula 3, $R_3$ to $R_8$ are independently selected from the group consisting of hydrogen, a halogen, a C1 to C10 alkyl, a C1 to C10 haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The negative electrode includes a current collector, and a negative active material layer that includes lithium-vanadium-based oxide as a negative active material, a binder, and optionally a conductive agent.

The negative active material can be a lithium-vanadium-based oxide represented by the following Formula 1:

$$Li_xM_yV_zO_{2+d}$$ [Chemical Formula 1]

In Formula 1, $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

In Formula 1, when x, y, z, and d are out of the aforementioned ranges, the negative active material may have an average potential of more than 1.0V against a lithium metal, resulting in a decreased discharge voltage of a battery.

The current collector may be selected from the group consisting of a copper foil, a nickel foil, a stainless steel foil, a titanium foil, a nickel foam, a copper foam, a polymer substrate coated with a conductive metal, and combinations thereof. According to an exemplary embodiment, the copper foil and the nickel foil are used as a current collector.

Examples of the binder include, but are not limited to, polyvinylalcohol, carboxylmethyl cellulose, hydroxypropylene cellulose, diacetylenecellulose, polyvinylchloride, polyvinylpyrrolidone, polytetrafluoroethylene, polyvinylidene fluoride, polyethylene, and polypropylene.

The negative electrode includes a conductive agent to improve the conductivity of the negative active material(s). Any electrically conductive material can be used as a conductive agent, unless it reacts chemically in the battery. Examples of the conductive agent include: natural graphite; artificial graphite; carbon black; acetylene black; ketjen black; carbon fiber; a metal powder or a metal fiber including copper, nickel, aluminum, silver, and the like; and a polyphenylene derivative.

The positive electrode includes a current collector, and a positive active material layer. The positive active material layer includes a positive active material, a binder, and a conductive agent. The positive active material may be a lithiated intercalation compound capable of intercalating and deintercalating lithium. Specifically, the positive active material includes a composite oxide including lithium and a metal selected from the group consisting of cobalt, manganese, nickel, and combinations thereof. The positive active material may be exemplified by compounds of the following Formulas 4 to 27:

$$Li_aA_{1-b}B_bD_2$$ [Chemical Formula 4]

wherein, in the above Formula, $0.95 \leq a \leq 1.1$ and $0 \leq b \leq 0.5$;

$$Li_aE_{1-b}B_bO_{2-c}F_c$$ [Chemical Formula 5]

wherein, in the above Formula, $0.95 \leq a \leq 1.1$, $0 \leq b \leq 0.5$, and $0 \leq c \leq 0.05$;

$$LiE_{2-b}B_bO_{4-c}F_c$$ [Chemical Formula 6]

wherein, in the above Formula, $0 \leq b \leq 0.5$, and $0 \leq c \leq 0.05$;

$$Li_aNi_{1-b-c}Co_bB_cD_\alpha$$ [Chemical Formula 7]

wherein, in the above Formula, $0.95 \leq a \leq 1.1$, $0 \leq b \leq 0.5$, $0 \leq c \leq 0.05$, and $0 \leq \alpha \leq 2$;

$$Li_aNi_{1-b-c}Co_bB_cO_{2-\alpha}F_\alpha$$ [Chemical Formula 8]

wherein, in the above Formula, $0.95 \leq a \leq 1.1$, $0 \leq b \leq 0.5$, $0 \leq c \leq 0.05$, and $0 < \alpha < 2$;

$$Li_aNi_{1-b-c}Co_bB_cO_{2-\alpha}F_2$$ [Chemical Formula 9]

wherein, in the above Formula, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cD_\alpha$$ [Chemical Formula 10]

wherein, in the above Formula, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cO_{2-\alpha}F_\alpha$$ [Chemical Formula 11]

wherein, in the above Formula, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cO_{2-\alpha}F_2$$ [Chemical Formula 12]

wherein, in the above Formula, $0.95 \leq a \leq 1.1$, $0 \leq b \leq 0.5$, $0 \leq c \leq 0.05$, and $0 < \alpha < 2$;

$$Li_aNi_bE_cG_dO_2$$ [Chemical Formula 13]

wherein, in the above Formula, $0.90 \leq a \leq 1.1$, $0 \leq b \leq 0.9$, $0 \leq c \leq 0.5$, and $0.001 \leq d \leq 0.1$;

$$Li_aNi_bCo_cMn_dG_eO_2$$ [Chemical Formula 14]

wherein, in the above Formula, $0.90 \leq a \leq 1.1$, $0 \leq b \leq 0.9$, $0 \leq c \leq 0.5$, $0 \leq d \leq 0.5$, and $0.001 \leq e \leq 0.1$;

$$Li_aNiG_bO_2$$ [Chemical Formula 15]

wherein, in the above Formula, $0.90 \leq a \leq 1.1$, and $0.001 \leq b \leq 0.1$;

$$Li_aCoG_bO_2$$ [Chemical Formula 16]

wherein, in the above Formula, $0.90 \leq a \leq 1.1$, and $0.001 \leq b \leq 0.1$;

$$Li_aMnG_bO_2$$ [Chemical Formula 17]

wherein, in the above Formula, $0.90 \leq a \leq 1.1$, and $0.001 \leq b \leq 0.1$;

$$Li_aMn_2G_bO_4$$ [Chemical Formula 18]

wherein, in the above Formula, $0.90 \leq a \leq 1.1$, and $0.001 \leq b \leq 0.1$;

$$QO_2$$ [Chemical Formula 19]

$$QS_2$$ [Chemical Formula 20]

$$LiQS_2$$ [Chemical Formula 21]

$$V_2O_5$$ [Chemical Formula 22]

$$LiV_2O_5$$ [Chemical Formula 23]

$$LiIO_2$$ [Chemical Formula 24]

$$LiNiVO_4$$ [Chemical Formula 25]

$$Li_{3-f}J_2(PO_4)_3 \ (0 \leq f \leq 3)$$ [Chemical Formula 26]

$$Li_{3-f}Fe_2(PO_4)_3 \ (0 \leq f \leq 2).$$ [Chemical Formula 27]

In the above Formulas 4 to 27, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, Sr, V, a lanthanide element such as La, and Ce, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The binder improves the binding of positive active material particles to each other and to a current collector. Examples of the binder include, but are not limited to, polyvinyl alcohol, carboxylmethyl cellulose, hydroxypropylene cellulose, diacetylene cellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, and an epoxy resin, and nylon.

The conductive agent improves electrical conductivity of an electrode. Any electrically conductive material can be used as a conductive agent unless it causes a chemical change. Examples of the conductive agent include natural graphite, artificial graphite, carbon black, acetylene black, ketjen black, a carbon fiber, a metal powder or a metal fiber including copper, nickel, aluminum, silver, and the like, and a polyphenylene derivative.

The current collector may be Al, but is not limited thereto.

The negative electrode may be fabricated as follows: a composition for a negative active material layer is prepared by mixing the negative active material, the binder, and optionally the conductive agent. The composition for a negative active material layer is coated on a current collector. The positive electrode may also be fabricated as follows: a composition for a positive active material layer is prepared by mixing the positive active material, the binder, and the conductive agent. The composition for a positive active material layer is coated on a current collector. Methods of manufacturing an electrode are well known in this art, so the detailed description will be omitted. The solvent may include N-methylpyrrolidone, but it is not limited thereto.

The rechargeable lithium battery may include a separator between the positive electrode and the negative electrode, if needed. The separator may include polyethylene, polypropylene, polyvinylidene fluoride, and multi-layers thereof, such as, a polyethylene/polypropylene double-layered separator, a polyethylene/polypropylene/polyethylene triple-layered separator, and a polypropylene/polyethylene/polypropylene triple-layered separator. According to one embodiment, a microporous membrane made of polyolefin, such as polyethylene and polypropylene, may be appropriate.

FIG. 1 shows a schematic view of a rechargeable lithium battery 1 according to and exemplary embodiment of the present invention. The rechargeable lithium battery 1 comprises a negative electrode 2, a positive electrode 3, a separator 4 interposed between the positive electrode 3 and the negative electrode 2, and an electrolyte (not shown) in which the separator 4 is immersed. The battery 1 comprises a cell case 5 and a sealing member 6 to seal the cell case 5. Even though the rechargeable lithium battery shown in FIG. 1 is formed in a cylindrical shape, it may be formed into various shapes, such as, a prismatic, a coin, or a sheet shape.

Rechargeable lithium batteries may be classified as lithium ion batteries, lithium ion polymer batteries, and lithium polymer batteries, according to the presence of a separator and the kind of electrolyte used in the battery. The rechargeable lithium batteries may have a variety of shapes and sizes, including cylindrical, prismatic, or coin-type, and may be a thin film battery or may be rather bulky in size. Structures and fabricating methods for lithium batteries are well known in the art.

The following examples illustrate aspects of the present invention in more detail. These examples, however, should not in any sense be interpreted as limiting the scope of the present invention.

EXAMPLES 1 TO 12

Ethylenecarbonate (EC) and diethylcarbonate (DEC) were mixed in a volume ratio of 30:70, to prepare a mixed solvent. Next, 5 parts by weight of fluoroethylenecarbonate (FEC) and 3 parts by weight of triethylene glycol dimethylether (TEGDME) were added to 100 parts by weight of the mixed solvent, to prepare a non-aqueous organic solvent. Then, a first lithium salt, $LiPF_6$, and a second lithium salt, $LiBC_2O_4F_2$ were added thereto, in amounts as shown in the following Table 1, to prepare an electrolyte.

An $Li_{1.1}V_{0.9}O_2$ negative active material, a polyvinylidene fluoride binder, and a super-P conductive material were mixed in a weight ratio of 94/3/3, in an N-methylpyrrolidone mixed solvent, to prepare a negative active material slurry. The slurry was coated on a current collector made of a thin aluminum film, dried, and pressed to fabricate a negative electrode.

In addition, a lithium cobalt oxide ($LiCoO_2$) positive active material, a polyvinylidene fluoride binder, and a super-P conductive material were mixed in a weight ratio of 94/3/3, in an N-methylpyrrolidone mixed solvent, to prepare a positive active material slurry. The slurry was coated on a current collector made of a thin aluminum film, dried, and pressed, to prepare a positive electrode.

The positive and negative electrodes and the electrolyte were used to fabricate in a rechargeable lithium battery, according to a conventional method.

TABLE 1

|  | first lithium salt $LiPF_6$ (M) | second lithium salt $LiBC_2O_4F_2$ (M) |
| --- | --- | --- |
| Example 1 | 0.7 | 0.3 |
| Example 2 | 1.2 | 0.3 |
| Example 3 | 0.8 | 0.4 |
| Example 4 | 1.1 | 0.4 |
| Example 5 | 0.9 | 0.5 |
| Example 6 | 1.0 | 0.5 |
| Example 7 | 0.9 | 0.6 |
| Example 8 | 1.0 | 0.6 |
| Example 9 | 0.8 | 0.7 |
| Example 10 | 1.1 | 0.7 |
| Example 11 | 0.7 | 0.8 |
| Example 12 | 1.2 | 0.8 |

COMPARATIVE EXAMPLE 1

A rechargeable lithium battery was fabricated, according to the same method as in Example 1, except that an electrolyte was prepared by mixing ethylenecarbonate (EC) and diethylcarbonate (DEC) in a volume ratio of 30:70, to prepare a mixed solvent. Then 5 parts by weight of fluoroethylenecarbonate (FEC) and 3 parts by weight of triethylene glycol dimethylether (TEGDME) were added to 100 parts by weight of the mixed solvent, to prepare a non-aqueous organic solvent. 0.5M of $LiPF_6$ and 0.2M of $LiBC_2O_4F_2$ were dissolved in the non-aqueous solvent to prepare the electrolyte.

COMPARATIVE EXAMPLE 2

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent. Then 5 parts by weight of fluoroethylenecarbonate (FEC) and 3 parts by weight of triethylene glycol dimethylether (TEGDME) were added to 100 parts by weight of the mixed solvent, to prepare a non-aqueous organic solvent. 1.4M of $LiPF_6$ and 0.2M of $LiBC_2O_4F_2$ were dissolved in the non-aqueous solvent to prepare the electrolyte.

COMPARATIVE EXAMPLE 3

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent. Then 5 parts by weight of fluoroethylenecarbonate (FEC) and 3 parts by weight of triethylene glycol dimethylether (TEGDME) were added to 100 parts by weight of the mixed solvent, to prepare a non-aqueous organic solvent. 0.5M of $LiPF_6$ and 1.0M of $LiBC_2O_4F_2$ were dissolved in the non-aqueous solvent to prepare the electrolyte.

COMPARATIVE EXAMPLE 4

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent. Then 5 parts by weight of fluoroethylenecarbonate (FEC) and 3 parts by weight of triethylene glycol dimethylether (TEGDME) were added to 100 parts by weight of the mixed solvent, to prepare a non-aqueous organic solvent. 1.4M of $LiPF_6$ and 1.0M of $LiBC_2O_4F_2$ were dissolved in the non-aqueous solvent to prepare the electrolyte.

COMPARATIVE EXAMPLE 5

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent. 1.4M of $LiPF_6$ and 1.0M of $LiBC_2O_4F_2$ were dissolved in the mixed solvent to prepare the electrolyte.

COMPARATIVE EXAMPLE 6

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent, 1.4M of $LiPF_6$ and 0.2M of $LiBC_2O_4F_2$ were dissolved in the mixed solvent to prepare the electrolyte.

COMPARATIVE EXAMPLE 7

A rechargeable lithium battery was fabricated, according to the same method as in Example 1, except that an electrolyte was prepared by mixing ethylenecarbonate (EC) and diethylcarbonate (DEC) in a volume ratio of 30:70, to prepare a mixed solvent. 0.5M of $LiPF_6$ and 1.0M of $LiBC_2O_4F_2$ were dissolved in the mixed solvent to prepare the electrolyte.

COMPARATIVE EXAMPLE 8

A rechargeable lithium battery was fabricated, according to the same method as in Example 1, except that an electrolyte was prepared by mixing ethylenecarbonate (EC) and diethylcarbonate (DEC), in a volume ratio of 30:70, to prepare a mixed solvent. 1.4M of $LiPF_6$ and 1.0M of $LiBC_2O_4F_2$ were dissolved in the mixed solvent to prepare the electrolyte.

COMPARATIVE EXAMPLE 9

A rechargeable lithium battery was fabricated, according to the same method as Example 1, except that an electrolyte was prepared by mixing ethylenecarbonate (EC) and diethylcarbonate (DEC), in a volume ratio of 30:70, to prepare a mixed solvent. 1.0M of $LiPF_6$ was dissolved in the mixed solvent to prepare the electrolyte.

COMPARATIVE EXAMPLE 10

Ethylenecarbonate (EC) and diethylcarbonate (DEC) were mixed in a volume ratio of 30:70, to prepare a mixed solvent. 1.0M of LiPF6 was dissolved in the mixed solve, to prepare an electrolyte. Then, graphite, a polyvinylidene fluoride binder, and a super-P conductive material were mixed in a weight ratio of 94/3/3, in an N-methylpyrrolidone solvent, to prepare a negative active material slurry. The slurry was coated on an aluminum current collector, dried, and pressed, to fabricate a negative electrode. Then, a rechargeable lithium battery was fabricated, according to the same method as in Example 1, except for these aforementioned processes.

COMPARATIVE EXAMPLES 11 TO 18

Ethylenecarbonate (EC) and diethylcarbonate (DEC) were mixed in a volume ratio of 30:70, to prepare a mixed solvent. Next, 5 parts by weight of fluoroethylenecarbonate (FEC) and 3 parts by weight of triethylene glycol dimethylether (TEGDME) were added to the mixed solvent, to prepare a non-aqueous organic solvent. Then, first lithium salt $LiPF_6$ and second lithium salt $LiBC_2O_4F_2$ were added to 100 parts by weight of the non-aqueous organic solvent, in amounts shown in the following Table 2, to prepare an electrolyte.

TABLE 2

| | first lithium salt $LiPF_6$ (M) | second lithium salt $LiBC_2O_4F_2$ (M) |
|---|---|---|
| Comparative Example 11 | 0.7 | 0.3 |
| Comparative Example 12 | 0.8 | 0.4 |
| Comparative Example 13 | 0.9 | 0.5 |
| Comparative Example 14 | 0.9 | 0.6 |
| Comparative Example 15 | 1.0 | 0.6 |
| Comparative Example 16 | 0.8 | 0.7 |
| Comparative Example 17 | 1.1 | 0.7 |
| Comparative Example 18 | 1.2 | 0.8 |

Graphite, a polyvinylidene fluoride binder, and a super-P conductive material were mixed in a weight ratio of 94/3/3, in an N-methylpyrrolidone mixed solvent, to prepare negative active material slurry. The slurry was coated on an aluminum current collector, dried, and pressed, to fabricate a negative electrode. Then, a rechargeable lithium battery was fabricated, according to the same method as in Example 1, except for these processes.

Examination of Initial Reversible Efficiency of A Battery

The batteries fabricated according to Examples 1, 2, 11, and 12 and Comparative Examples 1 to 4, 10 to 12, and 15 were respectively charged with 0.2 C up to 4.35V and then, discharged with 0.2 C up to 2.75V, for one cycle. Then, the examples were measured for an initial coulombic efficiency. The results are shown in the following Table 3.

TABLE 3

| | Initial reversible efficiency (%) |
|---|---|
| Example 1 | 90.64 |
| Example 2 | 91.10 |
| Example 11 | 90.20 |
| Example 12 | 90.08 |
| Comparative Example 1 | 80.22 |
| Comparative Example 2 | 86.72 |

TABLE 3-continued

|  | Initial reversible efficiency (%) |
| --- | --- |
| Comparative Example 3 | 87.05 |
| Comparative Example 4 | 60.37 |
| Comparative Example 10 | 86.01 |
| Comparative Example 11 | 84.30 |
| Comparative Example 12 | 85.42 |
| Comparative Example 15 | 85.06 |

As shown in Table 3, the rechargeable lithium batteries, according to Examples 1 to 2 and 11 to 12, had more than 90% of an initial reversible efficiency, showing better initial reversible efficiency, as compared to Comparative Examples 1 to 4, 10 to 12, and 15. In particular, Example 2, which included 1.2M of LiPF$_6$ and 0.3M of LiBC$_2$O$_4$F$_2$, had a 91.10% initial reversible efficiency, the best initial reversible efficiency of the group.

The LiPF$_6$ used in an amount of less than about 1.2M, and the LiBC$_2$O$_4$F$_2$ played a role of sufficiently supplying lithium and simultaneously, preventing the damage to the membrane.

Evaluation of Battery Characteristics

The rechargeable lithium batteries, according to Examples 1 to 2 and 11 to 12 and Comparative Examples 9 to 12, 15, and 18, were evaluated regarding their cycle-life characteristics.

The rechargeable lithium batteries of Examples 1 to 2 and 11 to 12 and Comparative Examples 9 to 12, 15, and 18 were charged with 0.8 C up to 4.35V and discharged with 1 C up to 3.0V, for 50 cycles. Then, the capacity retention up to 50$^{th}$ cycle was measured for each example.

Figure 2:
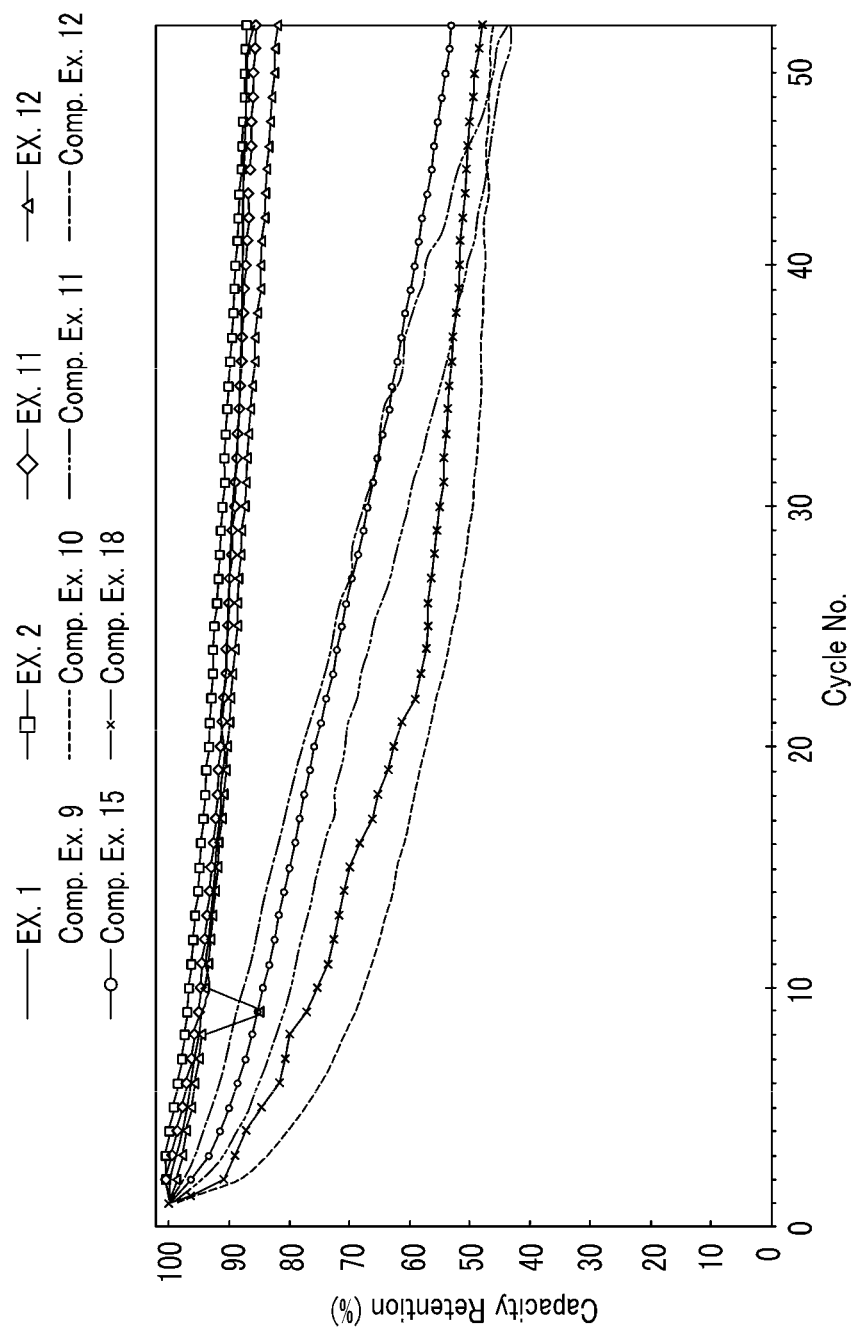
FIG. 2 is a graph showing cycle-life characteristics of the rechargeable lithium battery cells, according to Examples 1, 2, 11, and 12; and Comparative Examples 9 to 12, 15, and 18.

The results are shown in FIG. 2. The capacity retention after the 50th cycle is a ratio of discharge capacity at the first cycle to the discharge capacity at the 50$^{th}$ cycle.

As shown in FIG. 2, Examples 1 to 2 and 11 to 12 had similar capacity retention to Comparative Examples 9 to 12, 15, and 18, at 4 to 5 cycles. However, Examples 1 to 2 and 11 to 12 exhibited better capacity retention after 10 cycles, while Comparative Examples 9 to 12, 15, and 18 had sharply reduced capacity retention of less than 55%. Particularly, Example 2 turned out to have excellent capacity retention, as compared with Comparative Example 10. Accordingly, a rechargeable lithium battery including a lithium-vanadium-based oxide showed better characteristics than a rechargeable lithium battery including a carbon-based negative active material.

In other words, Examples 1 to 2 and 11 to 12, which include a LiPF$_6$ lithium salt, fluoroethylenecarbonate, and triethylene glycol dimethylether, had better cycle-life characteristics than Comparative Examples 1 to 10.

Therefore, a rechargeable lithium battery, according to aspects of the present invention, includes a lithium salt electrolyte including a first lithium salt and a second lithium salt. The battery is sufficiently supplied with lithium, has the improved cycle-life characteristics of a lithium-vanadium-based oxide battery, and has a high-capacity.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rechargeable lithium battery comprising:
a negative electrode comprising a lithium-vanadium-based oxide as a negative active material;
a positive electrode comprising a positive active material capable of intercalating and deintercalating lithium ions; and
an electrolyte comprising a non-aqueous organic solvent, 0.7 to 1.2M of a first lithium salt comprising LiPF$_6$, and 0.3 to 0.8M of a second lithium salt comprising LiBC$_2$O$_4$F$_2$.

2. The rechargeable lithium battery of claim 1, wherein the electrolyte comprises the first lithium salt at a concentration of 0.8 to 1.2M.

3. The rechargeable lithium battery of claim 1, wherein the electrolyte comprises the second lithium salt at a concentration of 0.3 to 0.7M.

4. The rechargeable lithium battery of claim 1, wherein the first lithium salt consists of LiPF$_6$, and the second lithium salt consists of LiBC$_2$O$_4$F$_2$.

5. The rechargeable lithium battery of claim 1, wherein the first lithium salt and the second lithium salt are included in the electrolyte in a mole ratio of 1:0.2 to 1:1.2.

6. The rechargeable lithium battery of claim 1, wherein the first lithium salt and the second lithium salt are included in the electrolyte in a mole ratio of 1:0.25 to 1:1.14.

7. The rechargeable lithium battery of claim 1, wherein the lithium-vanadium-based oxide is represented by Formula 1:

$$Li_xM_yV_zO_{2+d}, \quad \text{Formula 1}$$

wherein $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

8. The rechargeable lithium battery of claim 1, wherein the non-aqueous organic solvent comprises a solvent selected from the group consisting of carbonate-based solvents, ester-based solvents, ketone-based solvents, alcohol-based solvents, aprotic solvents, and combinations thereof.

9. The rechargeable lithium battery of claim 1, wherein the electrolyte further comprises an additive comprising an ethylene carbonate-based compound and an ether-based compound.

10. The rechargeable lithium battery of claim 9, wherein the additive comprises 1 to 7 parts by weight of the ethylene carbonate-based compound based on 100 parts by weight of the non-aqueous organic solvent and 0.01 to 5 parts by weight of the ether-based compound based on 100 parts by weight of the non-aqueous organic solvent.

11. The rechargeable lithium battery of claim 9, wherein the ethylene carbonate-based compound is represented by Formula 2:

Formula 2

$$\begin{array}{c} O \\ \| \\ O \diagup \diagdown O \\ | \quad | \\ R_2 \quad R_1, \end{array}$$

wherein, $R_1$ and $R_2$ are independently selected from the group consisting of hydrogen, a halogen, a cyano (CN), a nitro (NO$_2$), and a C1 to C5 fluoroalkyl, and at least one of $R_1$ and $R_2$ is selected from the group consisting of a halogen, a cyano (CN), a nitro ($NO_2$), and a C1 to C5 fluoroalkyl.

12. The rechargeable lithium battery of claim 11, wherein the ethylene carbonate-based compound is selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof.

13. The rechargeable lithium battery of claim 9, wherein the ether-based compound comprises a compound selected from the group consisting of dimethoxyethane (DME), bis(2-methoxyethyl)ether (DGM), triethylene glycol dimethylether (TEGDME), tetraethylene glycol dimethylether (TetGM), polyethylene glycol dimethylether (PEGDME), propylene glycol dimethylether (PGDME), dioxolane, and combinations thereof.

14. The rechargeable lithium battery of claim 1, wherein the positive active material is selected from the group consisting of compounds represented by Formulas 4 to 27:

$$Li_aA_{1-b}B_bD_2, \quad \text{Formula 4}$$

wherein, in the above Formula, $0.95 \le a \le 1.1$ and $0 \le b \le 0.5$;

$$Li_aE_{1-b}B_bO_{2-c}F_c, \quad \text{Formula 5}$$

wherein, in the above Formula, $0.95 \le a \le 1.1$, $0 \le b \le 0.5$, and $0 \le c \le 0.05$;

$$LiE_{2-b}B_bO_{4-c}F_c, \quad \text{Formula 6}$$

wherein, in the above Formula, $0 \le b \le 0.5$, and $0 \le c \le 0.05$;

$$Li_aNi_{1-b-c}Co_bB_cD_\alpha, \quad \text{Formula 7}$$

wherein, in the above Formula, $0.95 \le a \le 1.1$, $0 \le b \le 0.5$, $0 \le c \le 0.05$, and $0 < \alpha \le 2$;

$$Li_aNi_{1-b-c}Co_bB_cO_{2-\alpha}F_\alpha, \quad \text{Formula 8}$$

wherein, in the above Formula, $0.95 \le a \le 1.1$, $0 \le b \le 0.5$, $0 \le c \le 0.05$, and $0 < \alpha < 2$;

$$Li_aNi_{1-b-c}Co_bB_cO_{2-\alpha}F_2, \quad \text{Formula 9}$$

wherein, in the above Formula, $0.95 \le a \le 1.1$, $0 \le b \le 0.5$, $0 \le c \le 0.05$, and $0 < \alpha < 2$;

$$Li_aNi_{1-b-c}Mn_bB_cD_\alpha, \quad \text{Formula 10}$$

wherein, in the above Formula, $0.95 \le a \le 1.1$, $0 \le b \le 0.5$, $0 \le c \le 0.05$, and $0 < \alpha \le 2$;

$$Li_aNi_{1-b-c}Mn_bB_cO_{2-\alpha}F_\alpha, \quad \text{Formula 11}$$

wherein, in the above Formula, $0.95 \le a \le 1.1$, $0 \le b \le 0.5$, $0 \le c \le 0.05$, and $0 < \alpha < 2$;

$$Li_aNi_{1-b-c}Mn_bB_cO_{2-\alpha}F_2, \quad \text{Formula 12}$$

wherein, in the above Formula, $0.95 \le a \le 1.1$, $0 \le b \le 0.5$, $0 \le c \le 0.05$, and $0 < \alpha < 2$;

$$Li_aNi_bE_cG_dO_2, \quad \text{Formula 13}$$

wherein, in the above Formula, $0.90 \le a \le 1.1$, $0 \le b \le 0.9$, $0 \le c \le 0.5$, and $0.001 \le d \le 0.1$;

$$Li_aNi_bCo_cMn_dG_eO_2, \quad \text{Formula 14}$$

wherein, in the above Formula, $0.90 \le a \le 1.1$, $0 \le b \le 0.9$, $0 \le c \le 0.5$, $0 \le d \le 0.5$; and $0.001 \le e \le 0.1$;

$$Li_aNiG_bO_2, \quad \text{Formula 15}$$

wherein, in the above Formula, $0.90 \le a \le 1.1$, and $0.001 \le b \le 0.1$;

$$Li_aCoG_bO_2, \quad \text{Formula 16}$$

wherein, in the above Formula, $0.90 \le a \le 1.1$, and $0.001 \le b \le 0.1$;

$$Li_aMnG_bO_2, \quad \text{Formula 17}$$

wherein, in the above Formula, $0.90 \le a \le 1.1$, and $0.001 \le b \le 0.1$;

$$Li_aMn_2G_bO_4, \quad \text{Formula 18}$$

wherein, in the above Formula, $0.90 \le a \le 1.1$, and $0.001 \le b \le 0.1$;

$$QO_2; \quad \text{Formula 19}$$

$$QS_2; \quad \text{Formula 20}$$

$$LiQS_2; \quad \text{Formula 21}$$

$$V_2O_5; \quad \text{Formula 22}$$

$$LiV_2O_5; \quad \text{Formula 23}$$

$$LiIO_2; \quad \text{Formula 24}$$

$$LiNiVO_4; \quad \text{Formula 25}$$

$$Li_{3-f}J_2(PO_4)_3 \ (0 \le f \le 3); \text{ and} \quad \text{Formula 26}$$

$$Li_{3-f}Fe_2(PO_4)_3 \ (0 \le f \le 2), \text{ and} \quad \text{Formula 27}$$

wherein: A is selected from the group consisting of Ni, Co, Mn, and combinations thereof; B is selected from the group consisting of Al, Ni, Co, Mn, Cr, Fe, Mg, Sr, V, rare earth elements, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, Sr, V, lanthanide elements, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

* * * * *